Figure 1:
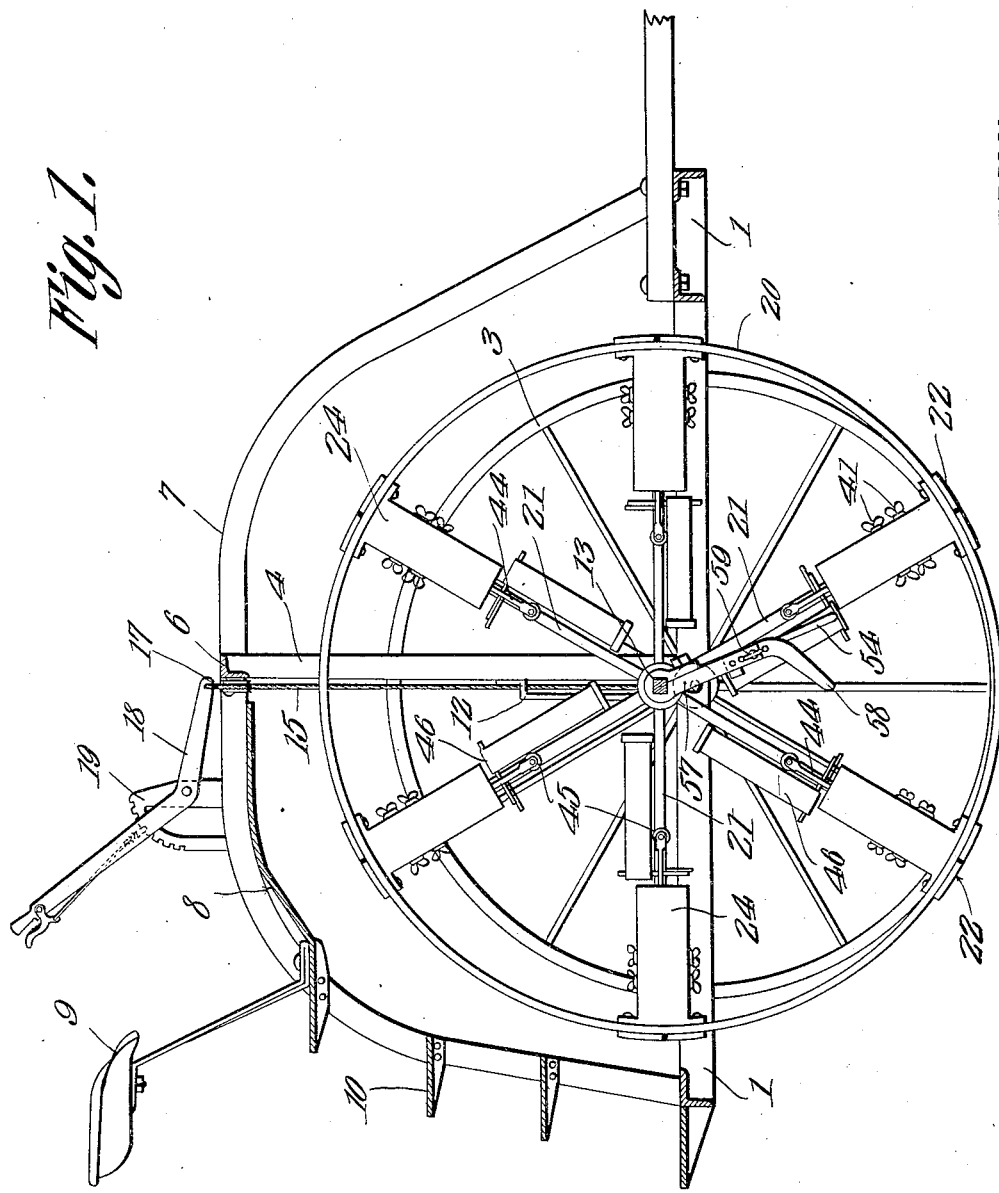

H. F. SPAULDING.
PLANTER.
APPLICATION FILED APR. 6, 1912.

1,042,617.

Patented Oct. 29, 1912.

3 SHEETS—SHEET 1.

Henry F. Spaulding
Inventor,
by C. A. Snow & Co.
Attorneys,

Witnesses

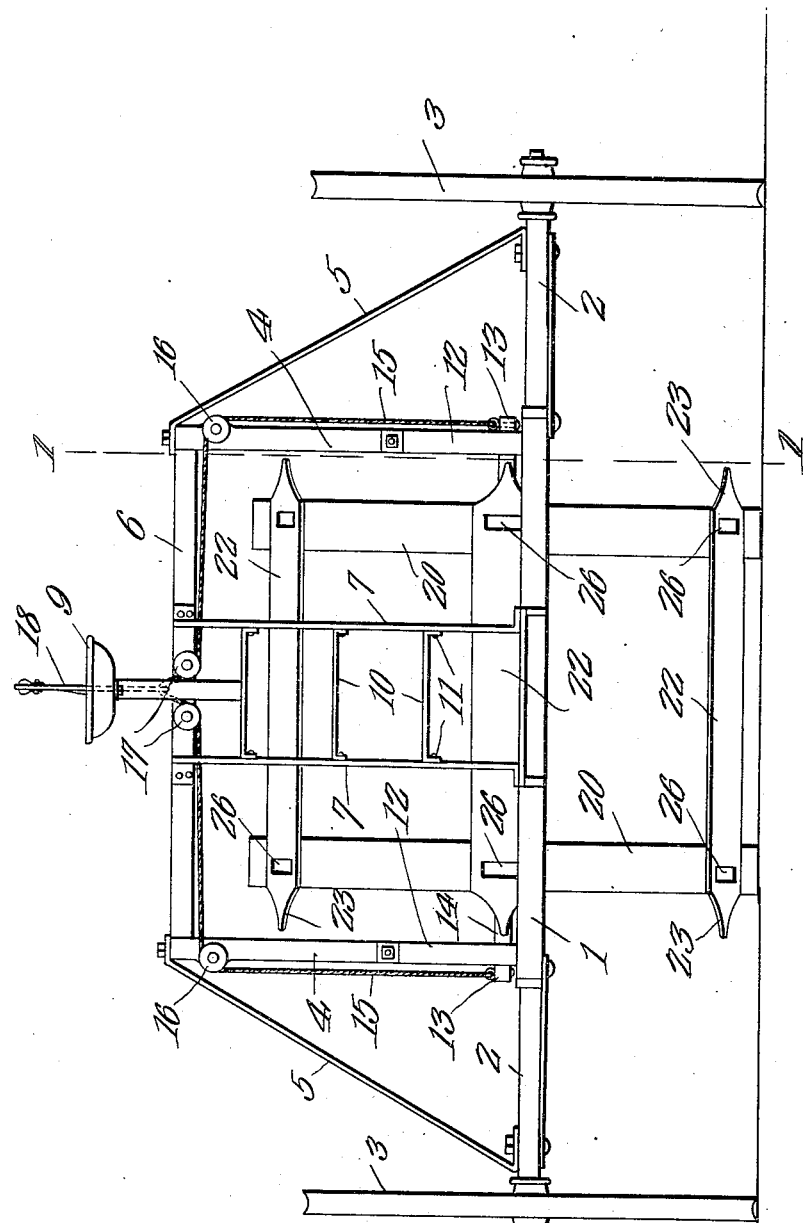

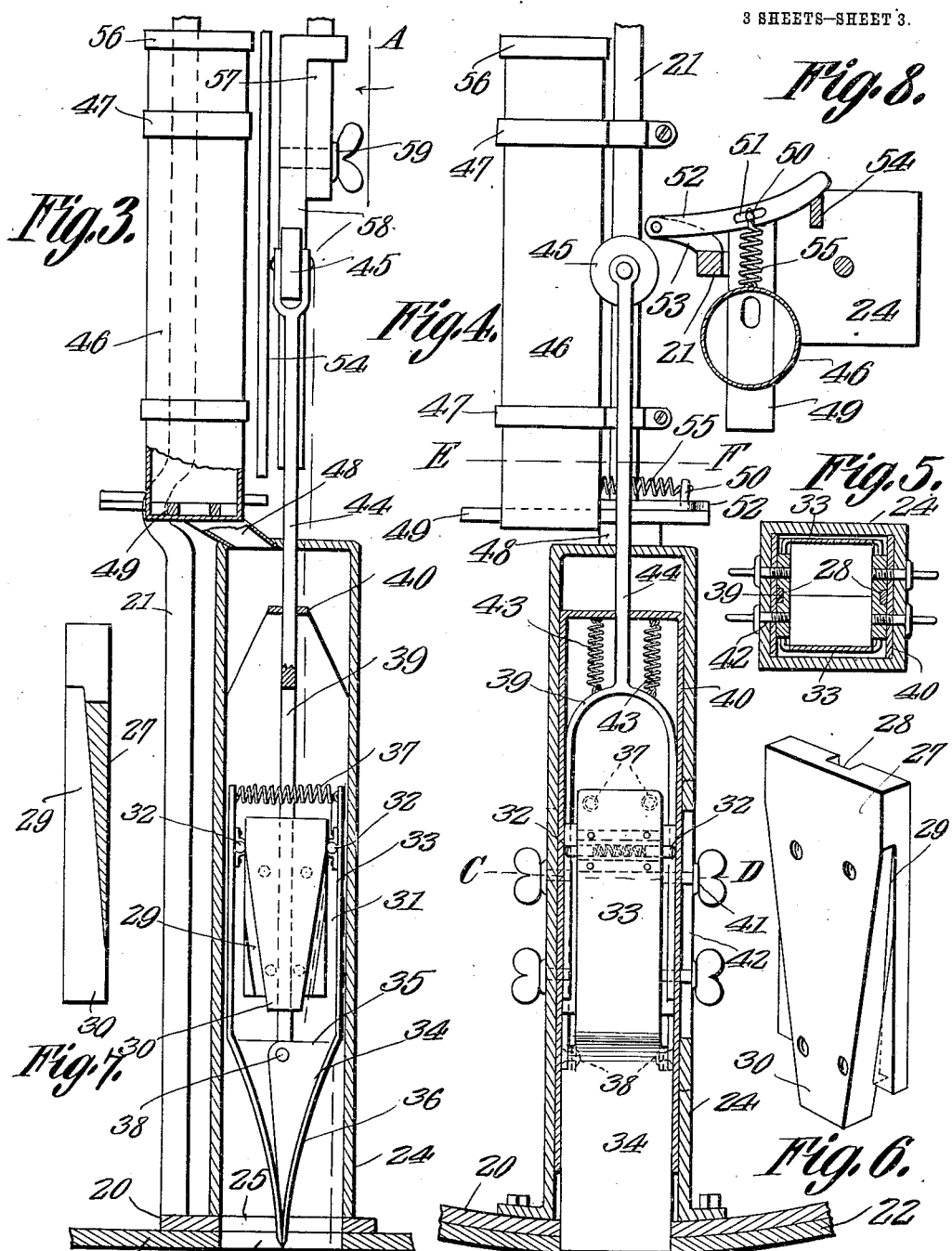

UNITED STATES PATENT OFFICE.

HENRY F. SPAULDING, OF CANASTOTA, SOUTH DAKOTA.

PLANTER.

1,042,617.  Specification of Letters Patent.  Patented Oct. 29, 1912.

Application filed April 6, 1912. Serial No. 688,947.

*To all whom it may concern:*

Be it known that I, HENRY F. SPAULDING, a citizen of the United States, residing at Canastota, in the county of McCook and State of South Dakota, have invented a new and useful Planter, of which the following is a specification.

This invention relates to planters, one of its objects being to provide a machine of this character designed not only to plant the seeds but also to mark off the rows and to check them so that the hills can be uniformly distributed over the field and can be easily seen after planting.

A further object is to provide improved means for planting the seeds without necessitating the use of a furrow opener such as commonly employed.

Another object is to provide adjustable means whereby the seeds can be planted at any depth desired.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a vertical longitudinal section through the machine, said section being taken on the line 1—1 Fig. 2. Fig. 2 is a rear elevation. Fig. 3 is an enlarged section through a portion of one of the planting wheels. Fig. 4 is a section on line A—B Fig. 3. Fig. 5 is a section on line C—D Fig. 4. Fig. 6 is a perspective view of one of the guide blocks. Fig. 7 is an enlarged section through the block and taken longitudinally of one of the channels therein. Fig. 8 is a section on line E—F Fig. 4.

Referring to the figures by characters of reference 1 designates a frame preferably formed of angle strips having stub shafts 2 extending laterally from the centers of the sides thereof and supported by wheels 3. These wheels are spaced apart a distance equal to the distance between four rows of hills.

Standards 4 extend upwardly from the centers of the sides of frame 1 and braces 5 connect the upper ends of the standards to the outer ends of the stub shafts 2. A cross beam 6 connects the upper ends of the standards 4 and these standards also support the middle portions of a super-structure made up of curved beams 7 the ends of which are attached to front and rear ends of the frame 1 while the intermediate portions of the beams are bowed upwardly, as shown particularly in Fig. 1. A platform 8 may be mounted on the beams 7 back of the cross beam 6 and a driver's seat 9 may be located close to and above this platform. Steps 10 may lead upwardly to the platform 8 from the rear portion of the frame 1, these steps being supported by side strips 11 provided for that purpose. Secured to and extending longitudinally of the standards 4 adjacent the lower ends thereof, are guide brackets 12 in which are slidably mounted the squared ends 13 of a non-rotatable axle 14. Flexible adjusting devices 15 are secured to the ends 13 of this axle and extend upwardly over guide sheaves 16 journaled on the upper portions of the standards 4. Said flexible elements 15 then extend under additional guide sheaves 17 and are connected to the lower arm of a bell crank lever 18. This lever is fulcrumed on a toothed segment 19 upstanding from the superstructure and any suitable means, such as a spring pressed pawl, may be provided for locking lever 18 to the segment 19. It will be apparent that by shifting lever 18 the connections 15 can be actuated so as to raise the axle 14 or to permit said axle to gravitate within the guide brackets 12.

Mounted for rotation on the axle 14 are spaced planting wheels each including a rim 20 and spokes 21, these rims being spaced apart a distance equal to the distances between the rims and the wheels 3. Marking strips 22 are secured to the rims 20 and have pointed terminals 23 projecting laterally beyond the rims. These marking strips 22 are parallel and are adapted to engage the soil successively and to form depressions therein when the planting wheels are drawn over the soil.

Secured to the inner surface of each rim 20 are angular casings 24 spaced apart equal distances and disposed radially along certain of the spokes of the planting wheel.

The outer end of each casing 24 is open, as shown at 25 and registers with an opening 26 extending through the wheel rim 20 and the adjacent portion of the marking strip 22. This casing is provided upon the inner faces of opposed walls, with similar guide blocks 27 each of which has a channel 28 in that face thereof contacting with the wall of the casing 24 while the other or inner face of the block is provided with downwardly converging grooves 29 gradually increasing in depth toward their lower ends. A tongue 30 extends below the lower ends of the channels 29 and, as shown in Fig. 6, the outer walls of the channels are preferably of less height than the inner walls thereof. These blocks 27 are spaced, at their side edges from the corresponding walls of the casing 24 so as to form passages 31 between the blocks and the side walls. These passages are adapted to receive spring pressed bolts 32 carried by wings 33 extending upwardly from the pivotally connected members 34 of the planting heads H. Each of these members is made up of triangular side wings 35 and a bottom portion 36 connecting the side wings, the bottom portions of the two sections normally converging downwardly and contacting so as thus to form between the wings and the converging bottom portions a pocket such as shown particularly in Fig. 3. A spring 37 connects the upper ends of the wings 33 and exerts a constant pull upon them. The members 34 of the planting head, however, are prevented from swinging apart about their pivot 38 as a result of this action of the spring, by reason of the fact that the bolts 32 are held spread apart by the blocks 27.

The pivot devices 38 are connected to the terminals of a fork 39 the arms of which are adapted to slide within channels 28 between the blocks 27 and a removable frame 40 which is arranged within the casing 24. This removable frame has clamping screws 41 extending from the sides thereof and through blocks 42 in opposed walls of the casing 24. Thus it will be seen that by loosening the screws 41, the frame 40 can be adjusted longitudinally within casing 24 and the blocks 27, which are secured to the frame, and the other parts of the planting mechanism, correspondingly adjusted within the frame. Springs 43 connect the fork 30 with the upper or crown portion of the frame 40 so as to hold the fork yieldingly supported and with the planting head H normally retracted into the casing 24, as shown in Fig. 3. A stem 44 extends from the fork 39 and through the frame 40 and the upper end of the casing 24, this stem carrying, at its outer or free end, an antifriction roller 45.

Secured to the spokes 21 between the hubs of the planting wheels and the casings 24 are seed boxes 46. Each seed box is preferably cylindrical and may be secured to the spoke by means of straps 47 or the like. The box has an outlet spout 48 extending from the bottom thereof and discharging into the end of the adjacent casing 24. This outlet spout is normally closed at its inlet end by a cut-off plate 49 which is slidably mounted in the discharge end portion of the seed box and has a pin 50 upstanding therefrom and extending through a slot 51 in an arm 52. This arm is pivotally connected to a bracket 53 extending from the spoke 21 and one end of the arm 52 projects to a point where it will engage and be actuated by a tripping rod 54 which is fixedly connected to and extends downwardly from the non-rotatable shaft 13. A spring 55 connects the arm 52 with the seed box 46 and serves to hold it normally in position with the plate 49 closing the outlet of the seed box.

It is of course to be understood that the inlet end of the seed box 46 is to be closed in any suitable manner, as by means of a cap 56.

An arm 57 extends downwardly from and is fixedly connected to the axle 14 and is adjustably engaged by a cam finger 58, this finger being adapted to slide along the arm 57 and having a clamping screw 59 or the like whereby it can be held in any position to which it may be adjusted. This cam finger 58 projects into the path of the antifriction rollers 45 and is adapted to be contacted by them successively during the rotation of the planting wheel.

It is to be understood that when it is not desired to plant seeds, it is merely necessary to shift lever 18 so as to elevate the shaft 13 and lift the planting wheels out of contact with the soil. While the wheels are thus elevated they can be rotated so as to bring any one of the marking strips 22 into position for engaging the soil at a point in alinement with a hill previously planted. After the planting wheels have been thus adjusted they can be lowered into contact with the soil and the machine moved forward. During this movement the planting wheels will be rotated by reason of their engagement with the soil and as each of the casings 24 moves toward the point of contact with the soil the arm 52 thereabove moves against the tripping rod 54 and is shifted thereby so as to actuate the plates 49 and permit a predetermined number of seeds to escape into the spout 48 and thence into the upper end of the casing 24. The seeds will gravitate through this casing 24 and into the planting head H which, as shown in Fig. 3, is normally closed together at its lower end. Immediately prior to the time when the casing 24 arrives in a vertical position, the roller 45 combined with said casing moves against the cam finger 58 and is forced downwardly thereby. The fork 39 is thus moved downwardly toward the outlet end of the casing 24, thereby placing spring 43 under stress. As the planting head H is connected to the fork 39 it too will be moved downwardly and the closed end of the head will be pressed into the soil. During this movement of the head the bolts 32 will travel downwardly within the channels 31 until they assume positions at the sides of the tongues 30 whereupon the spring 37, which is normally under stress, will pull the upper ends of the wings 33 toward each other and cause the bolts 32 to assume positions below the lower ends of the channels 29. During this movement of the bolts toward the tongues 30, the lower end of the planting head H is open and the seeds within the head are deposited within the soil. As soon as the bolts move into register with the lower ends of the channels 29, the springs 43, which are under stress, pull upwardly on the fork 39 and cause the bolts 32 to slide upwardly within the channels 29. As these channels diverge upwardly, it will be seen that the bolts will gradually move apart and, as the depth of the channels diminishes toward the upper ends thereof, the bolts will be gradually pressed back into their housings 32' until they pass out of the upper ends of the channels 29 whereupon the bolts will spring outwardly into the passages 31 and the parts will thus be reset and ready to repeat the operation above described. As each one of the casings 24 is brought down toward the lower portion of the planting wheel, the planting mechanism will operate in the manner hereinbefore described. Thus it will be seen that the seeds will be planted equal distances apart and it becomes unnecessary to form furrows as each planting head carries the seeds downwardly into the soil and, when withdrawn from the soil, a portion of the loose soil will fall into the opening and cover the seeds.

While the seeds are being planted, the wheels 3 are marking the point where one of the next rows of seeds are to be planted. Furthermore the strips 22 form depressions in the surface of the soil and by adjusting the strips 22 at the beginning of a row so as to form depressions alining with those previously produced, it will be seen that the seeds can be planted evenly. By adjusting the frame 40 within each casing 24, the depth of the planting can be regulated as desired. Such adjustment will of course necessitate corresponding adjustment of the cam finger 58.

Importance is attached to the fact that as the planting wheels move along the soil, portions of the soil will work up into the openings 26 and the soil surrounding the openings will be compressed or packed by the rims of the wheels. Thus, after the seeds have been planted, the hills will be clearly outlined upon the field. The depressions formed by the marking strips 22 will likewise be clearly visible so that there will be no difficulty in adjusting the machine at the beginning of each row.

What is claimed is:—

1. A planter including a wheel, a radially disposed casing therein, said casing having an outlet opening at its outer end, opposed members pivotally connected and mounted to slide within the casing, said members being normally closed together at their outer ends, means for directing seeds into the casing and thence into the space between the members, and means operated by the rotation of the wheel for automatically projecting the members from the casing and into the soil, moving apart the lower ends of the members to deposit the seeds into the soil, closing together the lower ends of the members, and retracting said members into the casing.

2. A planter including a wheel, a radially disposed casing therein having an outlet opening at its outer end, pivotally connected members normally housed in the casing and closed together at their outer ends, means operated by the rotation of the wheel for shifting the members from the casing and into the soil and retracting them into the casing, and means completely housed in the casing for automatically moving apart the outer ends of the members while in the soil and closing them together during the retraction of the members into the casing.

3. A planter including a wheel supported structure, planting wheels interposed therebetween and mounted for rotation, markers connecting the peripheral portions of the planting wheels, a radially disposed casing within each planting wheel, opposed pivotally connected members constituting planting heads normally housed within the casings, a seed box adapted to discharge into each casing and thence into the space between the members constituting the head within the casing, coöperating means upon the seed boxes and upon the wheel supported structure for successively opening the seed boxes to discharge seeds therefrom, and coöperating means upon the wheel supported structure and the respective members of each planting head, for acting upon the members in one casing to simultaneously project the members from the casing and into the soil, move said members apart at their lower ends, and retract the members from the soil and into the casing.

4. In a planter, a casing, a guide block secured therein and having downwardly converging channels increasing in depth toward their inner ends, a tongue spacing the lower ends of the channels, there being passages between the block and the adjacent walls of the casing, planting heads including pivotally connected downwardly converging members forming a seed receiving pocket, yielding means for holding said members normally spread apart, and means movable with the members along the passages to hold the members closed together, mechanism for shifting said holding means downwardly within the passages and beyond the ends thereof to allow the opening of the planting head, and means for automatically returning the said holding means to their initial positions within the passages by way of the channels.

5. A planter including a casing, a planting head mounted to slide therein and made up of pivotally connected members having downwardly converging bottom portions, wings extending from the members, guide blocks interposed between the wings and having upwardly diverging channels, there being a spacing projection between the lower ends of the channels, said blocks being spaced from the walls of the casing to form side passages, yielding projections upon the wings and normally extending into the passages, means for shifting said projections downwardly within the passages beyond the lower ends thereof, means for automatically shifting the projections toward each other and against the spacing means to open the members of the planting head, and means for automatically returning the planting head to its elevated and closed position by shifting the yielding projections upwardly within the channels and into the upper ends of the passages.

6. A planter including a wheel, a plurality of radially disposed casings, oppositely disposed pivotally connected similar members normally housed within each casing, said members being disposed in pairs, means for successively projecting the pairs of members beyond the casings, means for moving apart the outer ends of the members of each pair while projected, said means being completely housed within the casings, and means completely housed within the casings for automatically retracting the members into the casings subsequent to the opening thereof.

In testimony that I claim the foregoing as my own, I have hereto affixed my signature in the presence of two witnesses.

HENRY F. SPAULDING.

Witnesses:
 SELINA WILLSON,
 ERNEST F. RILEY.

---

Copies of this patent may be obtained for five cents each, by addressing the "Commissioner of Patents, Washington, D. C."